(No Model.)
J. F. HIME.
ANIMAL STOCK.
No. 346,285. Patented July 27, 1886.
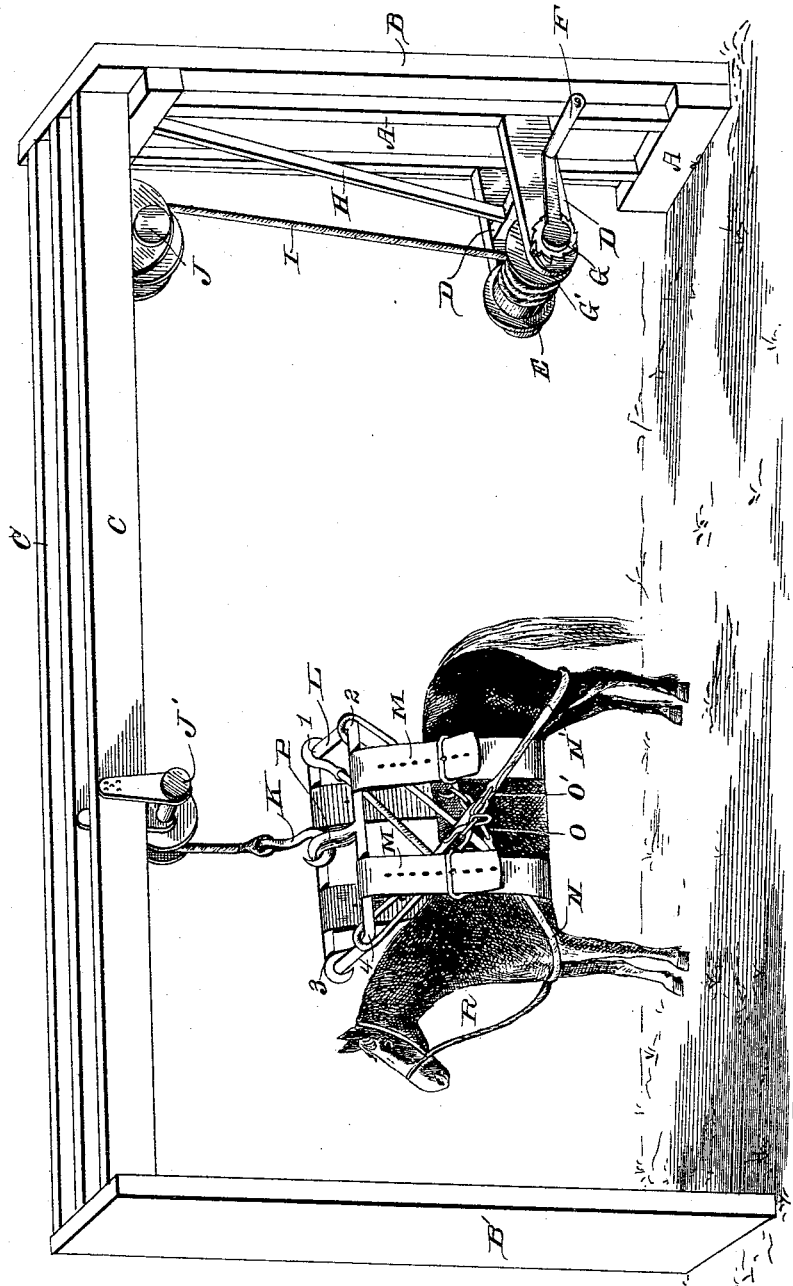
Witnesses
Inventor:
John F. Hime
By asso. Attorney

UNITED STATES PATENT OFFICE.

JOHN F. HIME, OF FARMERSVILLE, OHIO.

ANIMAL-STOCK.

SPECIFICATION forming part of Letters Patent No. 346,285, dated July 27, 1886.

Application filed May 14, 1886. Serial No. 202,178. (No model.)

*To all whom it may concern:*

Be it known that I, JOHN F. HIME, a citizen of the United States, residing at the village of Farmersville, and State of Ohio, have invented certain new and useful Improvements in Animal-Stocks; and I do declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to what are known as "animal-stocks;" and it consists of a novel arrangement of parts, hereinafter described, by means of which fractious horses are held for shoeing, or sick animals supported for medicinal purposes, the device nearly or wholly suspending the animal from the ground, as the case may be. I attain this object by the mechanism shown by the accompanying drawing, which is a perspective view of my device in operation.

Similar letters refer to similar parts.

A is a wooden frame attached to perpendicular plank B. B' is a similar perpendicular plank opposite to plank B, said planks forming supports at either end of horizontal beams C C C.

Planks B B' may represent opposite sides of a building in which my device is placed.

Into frame A are mortised standards D D, forming a frame-work to receive windlass E, provided with a projecting crank, F, and ratchet and pawl G G'.

H is a support-beam to frame-work D D.

To windlass E is attached a rope, I, leading up and over pulley-block J, along beams C C, over and down from pulley-block J', and ending in hook K.

J J' are pulley-blocks swung to horizontal beams C C C at a convenient distance apart.

L is a metal frame corresponding in width to about the width of an ordinary horse, and in length to about the length of an ordinary horse between the fore and hind legs.

P is an upwardly-bent bar across the width of frame L, and midway in its length, to receive hook K, attached to rope I. Suspended from frame L on either side of bar P are wide leather bands M M, provided with buckles and eyelets, by means of which a swing is made passing under and around the body of horse R. Bands M M are adjustable on frame L to accommodate animals of different lengths. Frame L has also suspended from its four corners ropes passing transversely down across the body of the animal, and around the fore and hind legs, and adjusted to its size by being hooked into small chains attached at or near the centers of said ropes. For this purpose I use two ropes, N N', with hooks at both ends, and chains O O', fastened at or near their centers. Rope N' is hooked to frame L at corner one, (1,) passing transversely down across the off side of horse H, and around the fore legs, and transversely up across the near side over frame L at corner two, (2,) and back into chain O. Rope N, starting from frame L at corner three, (3,) is attached in like manner, passing around the hind legs and up over frame L at corner four (4) and hooking into chain O', attached to its center. The purpose of these ropes is to prevent the kicking of an animal while being operated upon, and ropes are preferable to straps, because they embed themselves into the flesh of the animal and will not slip. The chains O O', attached to ropes N N', are to be used in tightening or loosening the ropes and adjusting the same to different-sized animals.

The animal is led under frame L, bands M M are adjusted on frame L to suit his length and then buckled, and in the manner herein described ropes N and N' are adjusted and hooked. The operator at crank F, by means of the windlass and rope, lifts the animal nearly or quite off the ground at pleasure, and ratchet and pawl G G' hold the windlass from rotation and the animal in position to be operated upon.

I am aware that it is not new to employ hoisting-slings and safety-ropes, and do not claim such, broadly.

Having described my invention, what I claim, and desire to secure by Letters Patent, is—

The combination, with the frame L, having upwardly-bent bar P, of the hoisting rope and hook I K, the bands or slings M M, the safety-ropes N N', provided with hooks at each end, and the adjustable hitching-chains O O', attached centrally to the said safety-ropes, as set forth.

JOHN F. HIME.

Witnesses:
DANIEL W. OLDFATHER,
CHAS. W. FINCH.